(No Model.)
T. PRASSE.
GUNSTOCK.
No. 546,344. Patented Sept. 17, 1895.
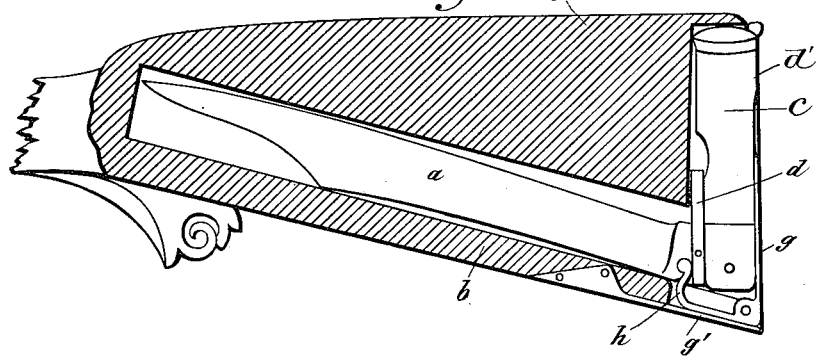
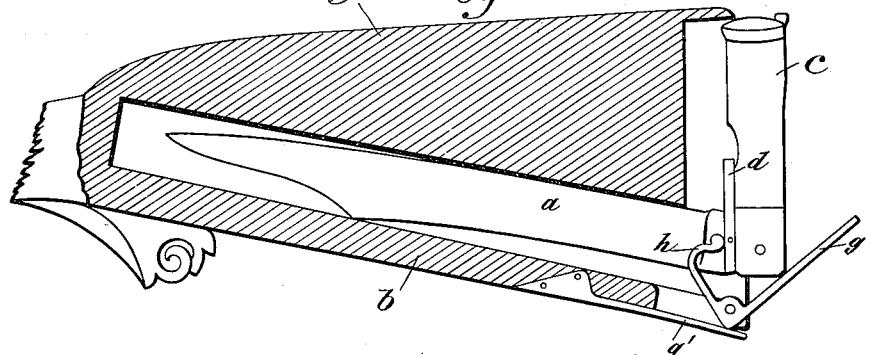
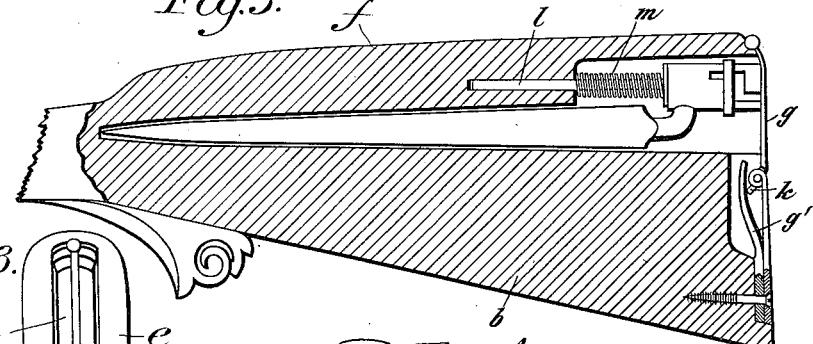
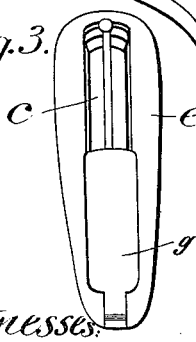
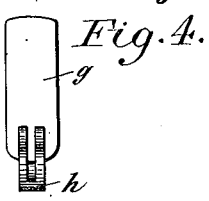
Witnesses:
T. H. Libbey
A. M. Parkins
Inventor:
Theodor Prasse
by
Rennie & Goldsborough
Attorneys

UNITED STATES PATENT OFFICE.

THEODOR PRASSE, OF LEITSWEILER, GERMANY.

GUN-STOCK.

SPECIFICATION forming part of Letters Patent No. 546,344, dated September 17, 1895.

Application filed October 11, 1894. Serial No. 525,604. (No model.)

*To all whom it may concern:*

Be it known that I, THEODOR PRASSE, forester for the town of Rothenburg, residing at Leitsweiler, Post Schnelldorf, Bavaria, in the Empire of Germany, have invented a new and useful Hunting Knife or Bayonet Arranged in the Stock of a Gun or Small Firearm, of which the following is a specification, reference being had therein to the accompanying drawings.

The accompanying invention has for its object to allow a huntsman to carry along a hunting-knife always ready to hand, and this object is accomplished by arranging such knife (or for particular purposes a bayonet) to be carried in a receptacle in the gun-stock.

The invention is shown in the accompanying drawings, wherein—

Figure 1 shows in section a gunstock with the hunting-knife in it; Fig. 2, a similar section showing the position of the knife with the lid or cover of the receptacle half opened. Fig. 3 shows the butt of the gun-stock; Fig. 4, the lid or cover detached, and Fig. 5 a section similar to Fig. 1 with a bayonet placed in the stock.

As seen from Fig. 1, the knife, when it is in the stock, is half open and is so arranged that on pulling it out by the handle the blade can be fully opened, so that, under the influence of a snap-spring, it forms a knife fixed in the handle. The knife is held fast in the receptacle *s* in the stock by a lid or cover *g*, which, in combination with a forked projection *h*, whose points are bent over in the shape of a hook, as shown in Fig. 2, forms also a means for releasing the knife. The projection *h* seizes the blade *a* of the knife between its prongs and with its bent-over points clamps itself fast against the guard *d* or the handle of the knife. Now if the lid *g* is opened the handle of the knife will be partly pulled out of the receptacle by the forked projection *h*, so that it can be conveniently grasped and quickly put into a condition for use. For holding the lid *g* fast there is provided on the lower side of the stock *b* a spring *g'*, that, like the spring of a penknife, operates on the point of the bell-crank lever formed by the lid *g* and the projection *h*, and so holds the lid closed and prevents the knife falling out.

If the stock is to be arranged to receive a bayonet, this is done in a similar way, as shown in Fig. 5. In this case the lid *g* of the receptacle is held by the spring *g'*, that operates on the projection *k* of the lid in its closed position. On opening the lid the bayonet is pressed out some distance by the pin *l*, on which the spiral spring *m* works, so that it can be easily taken hold of and entirely pulled out.

Having thus described my invention, what I claim is—

1. In a fire-arm, the combination of a receptacle in the stock, said receptacle being adapted to receive and hold a hunting knife or bayonet, a flap or cover for closing said receptacle, and means engaging the knife or bayonet for partially withdrawing it upon the opening of the cover; substantially as described.

2. In a fire-arm, the combination of a receptacle in the stock, said receptacle being adapted to receive and hold a hunting knife or bayonet, a hinged flap or cover for closing said receptacle, and means connected to the cover for engaging the knife or bayonet and partially withdrawing it as the cover is opened; substantially as described.

3. In a fire-arm, the combination of a receptacle in the stock, said receptacle being adapted to receive and hold a hinged-bladed hunting knife, one portion of said receptacle extending lengthwise of the stock, into which portion the open blade of the knife extends, and the other portion extending cross-wise of the slot, and adapted to receive the handle of the knife, and a flap or cover for closing the receptacle; substantially as described.

Nuremberg, September 14, 1894.

THEODOR PRASSE.

Witnesses:
   OTTO FRAUENHOLZ,
   OSCAR BOCK.